United States Patent
Matsubara et al.

(10) Patent No.: US 9,739,220 B2
(45) Date of Patent: Aug. 22, 2017

(54) VEHICLE DRIVE CONTROL DEVICE

(71) Applicant: TOYOTA JIDOSHA KABUSHIKI KAISHA, Toyota-shi, Aichi (JP)

(72) Inventors: Wataru Matsubara, Seto (JP); Hiroya Fujiwara, Nagoya (JP); Akira Hino, Toyota (JP); Shuhei Ishikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 14/740,913

(22) Filed: Jun. 16, 2015

(65) Prior Publication Data

US 2015/0369149 A1 Dec. 24, 2015

(30) Foreign Application Priority Data

Jun. 18, 2014 (JP) .................................. 2014-125828
Jun. 12, 2015 (JP) .................................. 2015-119713

(51) Int. Cl.
| | | |
|---|---|---|
| F02D 41/00 | (2006.01) | |
| F02B 37/16 | (2006.01) | |
| F02D 41/02 | (2006.01) | |

(52) U.S. Cl.
CPC .......... *F02D 41/0007* (2013.01); *F02B 37/16* (2013.01); *F02D 41/0215* (2013.01);
(Continued)

(58) Field of Classification Search
CPC .. F02D 41/007; F02D 41/021; F02D 41/0215; F02D 41/0225; F02D 41/023;
(Continued)

(56) References Cited

U.S. PATENT DOCUMENTS 4,964,318 A * 10/1990 Ganoung .............. B60W 30/18
123/478
5,337,715 A * 8/1994 Gonzales, Jr. ...... F02D 41/0005
123/325
(Continued)

FOREIGN PATENT DOCUMENTS

EP 1336737 A2 8/2003
JP S61-028716 A 2/1986
(Continued)

*Primary Examiner* — Lindsay Low
*Assistant Examiner* — George Jin
(74) *Attorney, Agent, or Firm* — Oliff PLC

(57) ABSTRACT

A vehicle drive control device in a vehicle including an engine comprising a throttle valve and a supercharger with an air bypass valve changed from a closing side to an opening side when a closing speed of the throttle valve is higher than a speed determination value, the vehicle drive control device providing a torque-down control of the engine by operating the throttle valve to a closing side, wherein at the time of provision of the torque-down control of the engine in which the throttle valve is operated to the closing side when a rotation speed of the engine is equal to or greater than a predetermined rotation speed and a speed ratio of a torque converter is equal to or less than a predetermined value in a supercharged state, the throttle valve is caused to perform a closing operation at the closing speed lower than the speed determination value.

4 Claims, 5 Drawing Sheets

(52) U.S. Cl.
CPC .... *F02D 41/021* (2013.01); *F02D 2200/0404* (2013.01); *F02D 2200/602* (2013.01); *F02D 2700/0248* (2013.01); *Y02T 10/144* (2013.01)

(58) Field of Classification Search
CPC ............. F02D 41/10; F02D 2200/1002; F02D 2200/101; F02D 2200/602; F02D 2700/0212; F02D 2700/0248; F02D 2700/0258; F02B 37/00; F02B 37/04; F02B 37/18; F02B 37/16; F02B 2037/125; F02B 2037/127; F02B 2037/162; B60W 10/10; B60W 10/06; B60W 10/101
USPC .......................................... 60/605.1, 608, 611
See application file for complete search history.

(56) References Cited

U.S. PATENT DOCUMENTS

| | | | | |
|---|---|---|---|---|
| 6,315,693 B1* | 11/2001 | Tayama | ............. | B60W 10/107 474/18 |
| 2003/0106539 A1* | 6/2003 | Jung | ........................ | F02B 37/16 123/559.1 |
| 2007/0022752 A1* | 2/2007 | Carbonne | ............... | F02B 37/00 60/600 |
| 2008/0022678 A1* | 1/2008 | Irisawa | ................... | F01N 3/101 60/600 |
| 2008/0022679 A1* | 1/2008 | Hara | ....................... | F02B 37/18 60/602 |
| 2008/0022968 A1 | 1/2008 | Miyauchi et al. | | |
| 2012/0221219 A1* | 8/2012 | Murata | ................... | F16H 61/14 701/60 |
| 2012/0291432 A1* | 11/2012 | Ulrey | ....................... | F02B 37/16 60/611 |
| 2013/0098032 A1* | 4/2013 | Wade | .................... | F02D 41/064 60/602 |
| 2014/0330492 A1* | 11/2014 | Hasegawa | ........... | F02D 41/0007 701/54 |
| 2015/0012205 A1* | 1/2015 | Sugano | ................. | B60W 10/06 701/103 |
| 2015/0051047 A1* | 2/2015 | Ota | ........................ | B60W 10/06 477/111 |
| 2015/0120115 A1* | 4/2015 | Chinbe | ................. | B60W 10/06 701/22 |
| 2015/0361903 A1* | 12/2015 | Matsunaga | ................ | F02D 9/08 123/559.1 |
| 2016/0061104 A1* | 3/2016 | Hirayama | ............... | F02D 41/12 60/602 |

FOREIGN PATENT DOCUMENTS

| | | |
|---|---|---|
| JP | H05-180027 A | 7/1993 |
| JP | 2005-069003 A | 3/2005 |
| JP | 2006-152894 A | 6/2006 |
| JP | 2008-025426 A | 2/2008 |

* cited by examiner

VEHICLE DRIVE CONTROL DEVICE

CROSS REFERENCE TO RELATED APPLICATION

The present application claims the priority from Japanese Patent Applications Nos. 2014-125828 filed on Jun. 18, 2014 and 2015-119713 filed on Jun. 12, 2015 claiming the priority from Japanese Patent Application No. 2014-125828, the disclosures of which are herein incorporated by reference in their entirety.

TECHNICAL FIELD

The present invention relates to a technique of suppressing an excessive reduction in engine torque at the time of torque-down control of an engine in a supercharged state and suppressing a reduction in engine torque responsiveness at the time of return from the torque-down control.

BACKGROUND ART

In a vehicle including a throttle valve and an engine having a supercharger, a vehicle drive control device is known that provides torque-down control of the engine in a supercharged state, for example, for the purpose of protection of a drive system by operating the throttle valve to the closing side if an engine rotation speed becomes equal to or greater than a predetermined value and a speed ratio of a torque converter becomes equal to or less than a predetermined value in a running range while a throttle opening degree and a requested torque are equal to or greater than predetermined values and a vehicle speed is equal to or less than a predetermined value. For example, this corresponds to vehicle drive control devices described in Japanese Laid-Open Patent Publication No. 2005-69003 and Japanese Laid-Open Patent Publication No. 5-180027.

SUMMARY OF THE INVENTION

Problem to be Solved by the Invention

To suppress generation of a surge pressure that is a sudden rise in intake pressure between an intake air compressor wheel of a supercharger and a throttle valve when the throttle valve is closed, the supercharger is conventionally provided with an air bypass valve communicating an upstream side and a downstream side of an intake compressor so that, for example, an intake air supercharged on the downstream side of the intake compressor is returned to the upstream side of the intake compressor. For example, when a closing speed of the throttle valve is higher than a predetermined speed, air bypass valve control of opening the air bypass valve is provided to suppress the generation of the surge pressure. Therefore, when the throttle valve is operated to the closing side at the time of the torque-down control of the engine in the supercharged state, the air bypass valve is opened in some cases.

FIG. 5 depicts an example of a time chart of each of an engine rotation speed Ne, a turbine rotation speed Nt, and an engine torque Te from the occurrence of the supercharged state to the end of the torque-down control when the air bypass valve is opened in the torque-down control of the engine supercharged at the time of stop (stall) of a vehicle. When both an accelerator pedal and a brake pedal are subjected to a depression operation to raise the engine rotation speed Ne (rpm) that is an input shaft rotation speed of a torque converter, since the turbine rotation speed Nt (rpm) is an output shaft rotation speed of the torque converter and is maintained at zero, the vehicle enters a stall state in which a speed ratio Nt/Ne of the torque converter is zero, and the engine enters a highly supercharged state. In the torque-down control provided for protection of the drive system at the time of stall of the vehicle in such a highly supercharged state, since it is required to promptly achieve a sudden reduction of the engine torque Te at the start of the control, the throttle valve is operated to the closing side and suddenly closed at a closing speed higher than the predetermined speed such that the actual engine torque Te follows a suddenly reduced target engine torque Tet. Therefore, the supercharged intake air on the downstream side of the intake compressor is returned to the upstream side via the air bypass valve opened for suppressing the generation of the surge pressure, and this may result in a problem (1) depicted in FIG. 5 that the engine rotation speed Ne is reduced lower than the requested engine rotation speed Net while the engine torque Te is reduced lower than the target engine torque Tet (reduced to an NA torque). After the depression operation of the brake pedal is no longer performed, a problem (2) depicted in FIG. 5 arises that the responsiveness of the engine torque Te is reduced at the return from the torque-down control started by an increase in the turbine rotation speed Nt.

The present invention was conceived in view of the situations and it is therefore an object of the present invention to suppress an excessive reduction in engine torque at the time of torque-down control of an engine in a supercharged state and to suppress a reduction in engine torque responsiveness at the time of return from the torque-down control in a vehicle including a throttle valve and the engine having a supercharger with an air bypass valve.

Means for Solving the Problem

That is, the first aspect of the present invention provides a vehicle drive control device in a vehicle including an engine comprising a throttle valve and a supercharger with an air bypass valve changed from a closing side to an opening side when a closing speed of the throttle valve is higher than a speed determination value, the vehicle drive control device providing a torque-down control of the engine by operating the throttle valve to a closing side, wherein at the time of provision of the torque-down control of the engine in which the throttle valve is operated to the closing side when a rotation speed of the engine is equal to or greater than a predetermined rotation speed and a speed ratio of the torque converter is equal to or less than a predetermined value in a supercharged state, the throttle valve is caused to perform a closing operation at the closing speed lower than the speed determination value.

Effects of the Invention

According to the vehicle drive control device of this invention, at the time of provision of the torque-down control of the engine in which the throttle valve is operated to the closing side when the rotation speed of the engine is equal to or greater than the predetermined rotation speed and the speed ratio of the torque converter is equal to or less than the predetermined value in the supercharged state, the throttle valve is caused to perform the closing operation at the closing speed lower than the speed determination value and, therefore, the air bypass valve is not opened. The air bypass valve is opened when the closing speed of the throttle valve is higher than the speed determination value. This enables the suppression of the excessive reduction in the engine torque during the torque-down control of the engine at the time of stall of the vehicle in the supercharged state and the suppression of the reduction in engine torque responsiveness at the time of return from the torque-down control.

Preferably, the second aspect of the invention provides the vehicle drive control device recited in the first aspect of the invention, wherein with regard to the torque-down control of the engine in which the throttle valve is caused to perform the closing operation at the closing speed lower than the speed determination value when the rotation speed of the engine is equal to or greater than the predetermined rotation speed and the speed ratio of the torque converter is equal to or less than the predetermined value in the supercharged state, the torque-down control is started earlier than a start timing of a torque-down control of the engine in which the throttle valve is operated at the closing speed higher than the speed determination value. This enables the suppression of a delay in engine torque responsiveness corresponding to a reduction in the target engine torque at the time of the torque-down control.

MODE FOR CARRYING OUT THE INVENTION

An example of a vehicle drive control device of the present invention will now be described in detail with reference to the drawings.

Example

Figure 1:
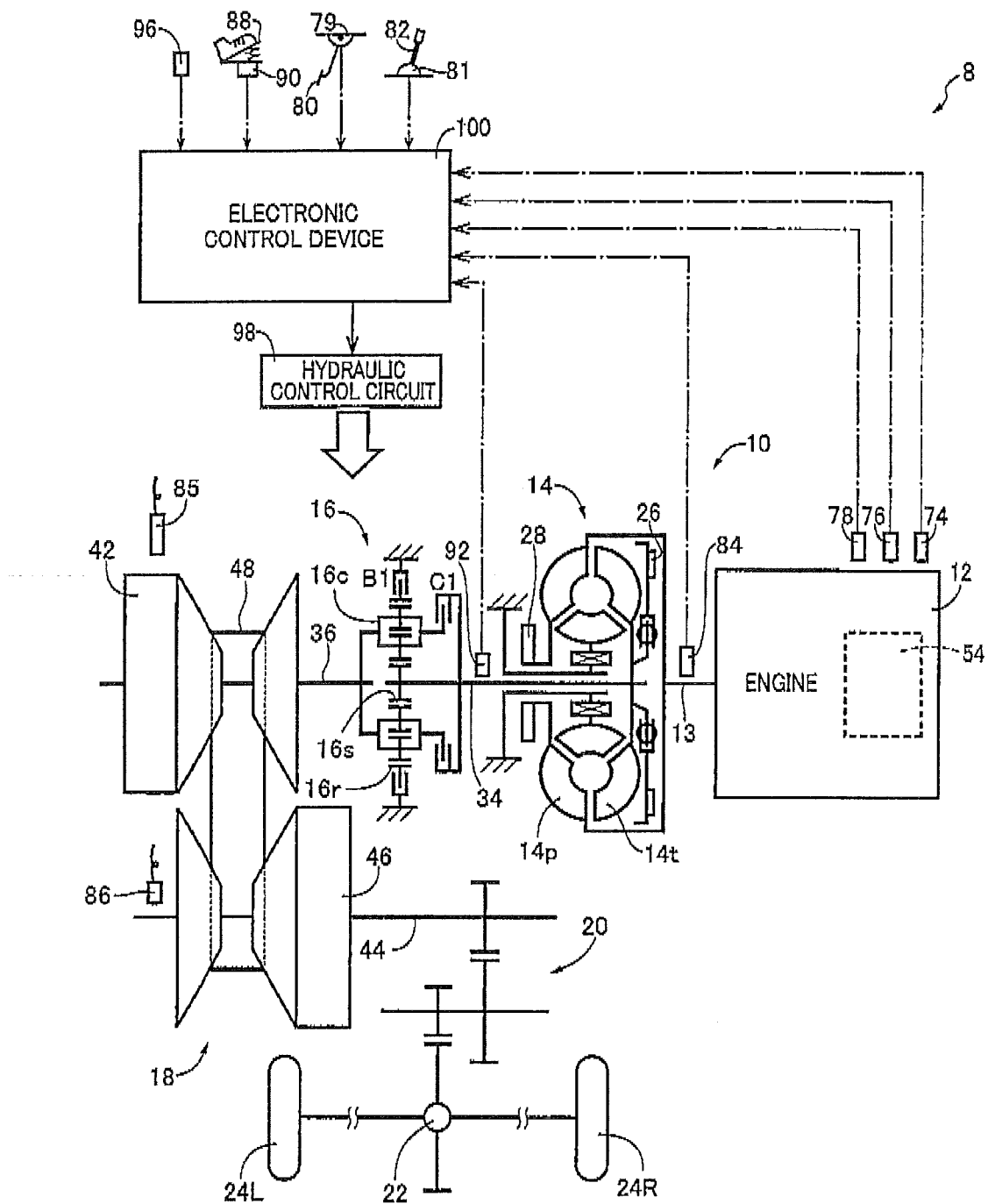
FIG. 1 is a schematic of a drive device included in a vehicle to which the present invention is applied.

FIG. 1 is a schematic of a vehicle drive device 10 included in a vehicle 8 to which the present invention is applied. The vehicle drive device 10 is of a transverse type and is preferably employed for an FF (front-engine front-drive) vehicle. As depicted in FIG. 1, the vehicle drive device 10 includes an engine 12 as a power source for running, a torque converter 14, a forward/backward switching device 16, and a belt type continuously variable transmission 18. An output (power) of the engine 12 is transmitted from a crankshaft 13 of the engine 12 sequentially via the torque converter 14, the forward/backward switching device 16, an input shaft 36, the belt type continuously variable transmission 18 (hereinafter referred to as a continuously variable transmission 18), and a reduction gear device 20 to a differential gear device 22 and is distributed to a pair of left and right drive wheels 24L, 24R (referred to as drive wheels 24 if not particularly distinguished between left and right).

The torque converter 14 is a fluid transmission device disposed between the engine 12 and the continuously variable transmission 18 and includes a pump impeller 14$p$ as an input rotating member coupled to the crankshaft 13 of the engine 12 and a turbine impeller 14$t$ as an output rotating member coupled to the forward/backward switching device 16 via a turbine shaft 34 so as to transmit power via fluid.

The torque converter 14 includes a lockup clutch 26 between the pump impeller 14$p$ and the turbine impeller 14$t$. The lockup clutch 26 is a friction engagement device capable of directly coupling the pump impeller 14$p$ and the turbine impeller 14$t$ and is engaged or released by switching hydraulic supply by a hydraulic control valve etc. of a hydraulic control circuit 98. For example, when the lockup clutch 26 is put into a direct coupling state (a completely engaged state) through the hydraulic control, this causes the pump impeller 14$p$ and the turbine impeller 14$t$ to integrally rotate. The pump impeller 14$p$ is coupled to a mechanical oil pump 28 and the oil pump 28 acts as a hydraulic supply source in the vehicle drive device 10 and also supplies lubrication oil to the portions.

The forward/backward switching device 16 is mainly made up of a double-pinion type planetary gear device and is configured such that the turbine shaft 34 of the torque converter 14 is integrally coupled to a sun gear 16$s$ and that the input shaft 36 of the continuously variable transmission 18 is integrally coupled to a carrier 16$c$ while the carrier 16$c$ and the sun gear 16$s$ are selectively coupled via a forward clutch C1 and a ring gear 16$r$ is selectively fixed via a backward brake B1 to a housing. The forward clutch C1 and the backward brake B1 are both hydraulic friction engagement devices frictionally engaged by hydraulic cylinders. When the forward clutch C1 is completely engaged and the backward brake B1 is released in the forward/backward switching device 16, the sun gear 16$s$, the carrier 16$c$, and the ring gear 16$r$ of the forward/backward switching device 16 are put into an integrally rotating state and a drive force for driving the vehicle in a forward direction is transmitted toward the continuously variable transmission 18. On the other hand, when the backward brake B1 is completely engaged and the forward clutch C1 is released, the input shaft 36 is rotated in the direction opposite to the turbine shaft 34 and a drive force for driving the vehicle in a backward direction is transmitted toward the continuously variable transmission 18. When both the forward clutch C1 and the backward brake B1 are released, the forward/backward switching device 16 becomes neutral (enters an interrupted state) to interrupt the power transmission.

The continuously variable transmission 18 is an automatic transmission having a gear ratio $\gamma$ at (=input rotation speed Nin/output rotation speed Nout) continuously varied by the hydraulic control. Specifically, the continuously variable transmission 18 includes an input-side variable pulley 42 having a variable effective diameter and acting as an input-side member disposed on the input shaft 36, an output-side variable pulley 46 having a variable effective diameter and acting as an output-side member disposed on an output shaft 44 of the continuously variable transmission 18, and a power transmission belt 48 wound between the variable pulleys 42, 46, and power is transmitted via a friction force between the variable pulleys 42, 46 and the power transmission belt 48. The continuously variable transmission 18 makes up a portion of a power transmission path from the engine 12 to the drive wheels 24 and outputs the power of the engine 12 to the drive wheels 24. The gear ratio γ at of the continuously variable transmission 18 is varied when V-groove widths of the both variable pulleys 42, 46 are varied to change winding diameter (effective diameter) of the power transmission belt 48. An electronic control device 100 sequentially determines a target rotation speed Nint of the input rotation speed Nin based on a vehicle speed V and an accelerator opening degree PAP from a shift map empirically set in advance such that both fuel consumption performance and running performance of the vehicle are satisfied, and performs a shift of the continuously variable transmission 18 such that the actual input rotation speed Nin is brought closer to, for example, made identical to, the target rotation speed Nint. Specifically, the shift map is a generally known map and is set such that the target rotation speed Nint is made higher when the accelerator opening degree PAP is larger and, therefore, the gear ratio γ at of the continuously variable transmission 18 becomes larger as the accelerator opening degree PAP increases in accordance with the shift map. The input rotation speed Nin is the rotation speed (rpm) of the input shaft 36 and the output rotation speed Nout is the rotation speed (rpm) of the output shaft 44.

The engine 12 is an internal combustion engine such as a diesel engine or a gasoline engine and includes a supercharger 54. The supercharger 54 is provided in an intake system of the engine 12 and is a known exhaust turbine supercharger, i.e., a turbocharger, rotationally driven by exhaust of the engine 12 to boost intake air of the engine 12.

Figure 2:
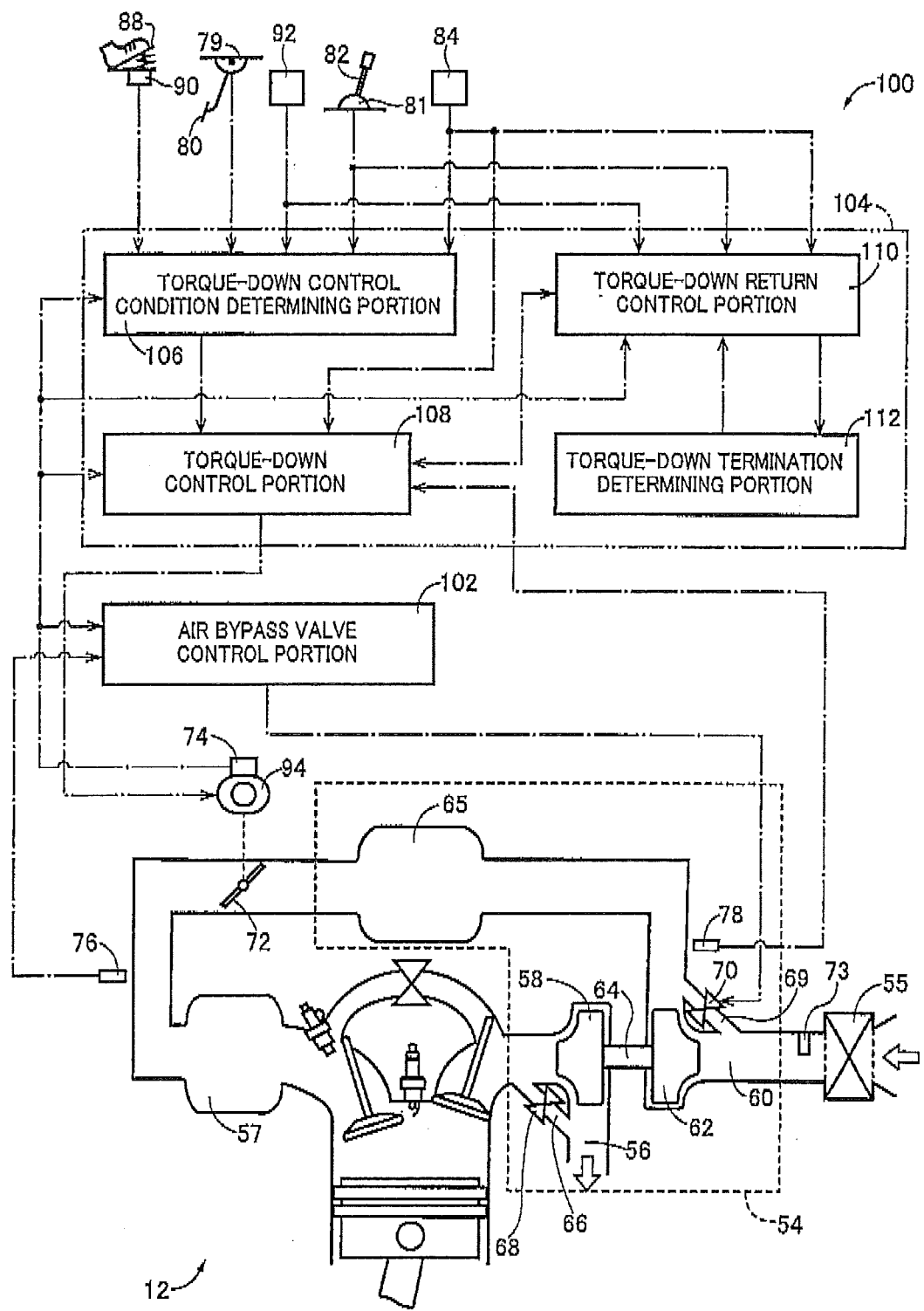
FIG. 2 is a functional block diagram for explaining a main portion of control function included in an electronic control device of FIG. 1.

FIG. 2 is a functional block diagram for explaining a main portion of control function included in the electronic control device 100. The supercharger 54 is included in the intake system of the engine 12 and is disposed between an air cleaner 55 cleaning the intake air sucked in the direction of a white arrow indicative of a leftward direction in FIG. 2 and an intake manifold 57 sending out the supercharged intake air to each cylinder of the engine 12. The supercharger 54 includes an exhaust turbine wheel 58 disposed in an exhaust pipe 56 of the engine 12 and rotationally driven by the exhaust of the engine 12, an intake air compressor wheel 62 disposed in an intake pipe 60 of the engine 12 and rotated by the exhaust turbine wheel 58 to compress the intake air of the engine 12, and a rotation shaft 64 coupling the exhaust turbine wheel 58 and the intake air compressor wheel 62. When the exhaust of the engine 12 sufficient for driving the supercharger 54 is guided to the exhaust turbine wheel 58 along a white arrow indicative of a downward direction in FIG. 2, the engine 12 operates in a supercharged state in which the engine 12 is supercharged by the supercharger 54. On the other hand, if the exhaust of the engine 12 guided to the exhaust turbine wheel 58 is insufficient for driving the supercharger 54, the supercharger 54 is almost not driven and the engine 12 operates in a state of supercharging suppressed as compared to the supercharged state, i.e., a natural aspiration state (also referred to as NA state or a non-supercharged state), which is a state of unsupercharged intake air equivalent to a natural aspirated engine without the supercharger 54. The supercharger 54 includes an intercooler 65 cooling the intake air compressed by the intake air compressor wheel 62 on the downstream side of the intake air compressor wheel 62.

Additionally, an exhaust bypass path 66 is disposed in parallel with an exhaust path in which the exhaust turbine wheel 58 in the exhaust pipe 56 is disposed, and a waist gate valve 68 is disposed that opens and closes the exhaust bypass path 66. The waist gate valve 68 has an opening degree θwg of the waist gate valve 68 (hereinafter referred to as a waist gate valve opening degree θwg) made continuously adjustable, and the electronic control device 100 controls an electric actuator to continuously open and close the waist gate valve 68 by utilizing a pressure in the intake pipe 60. When the waist gate valve opening degree θwg is larger, the exhaust of the engine 12 is more easily discharged through the exhaust bypass path 66 and, therefore, if exhaust from an exhaust port of the engine 12 is acquired to the extent that the engine 12 can be put into the supercharged state, a downstream air pressure PLin of the intake air compressor wheel 62 in the intake pipe 60, i.e., a supercharging pressure Pcmout (=PLin) of the supercharger 54, becomes lower when the waist gate valve opening degree θwg is larger. Therefore, the waist gate valve 68 acts as a supercharging pressure adjusting device adjusting the supercharging pressure Pcmout. For example, a supercharging operation map is empirically set in advance with a region divided into a supercharging area that is an operating range (range of an engine operating point) for putting the engine 12 into the supercharged state, and a non-supercharging area that is an operation range set on the lower engine torque side relative to the supercharging area for putting the engine 12 into the non-supercharged state. If the operating point of the engine 12 (engine operating point) represented by an engine rotation speed Ne and an engine torque Te is moved from the non-supercharging area to the supercharging area, the electronic control device 100 actuates the waist gate valve 68 in the closing direction, thereby causing the supercharger 54 to perform the supercharging. Conversely, if the engine operating point is moved from the supercharging area to the non-supercharging area, the electronic control device 100 actuates the waist gate valve 68 in the opening direction, thereby stopping or suppressing the supercharging by the supercharger 54. The supercharging operation map is empirically set in advance so as to acquire a largest possible drive force Fc in accordance with a driver's request, for example, and to suppress deterioration in fuel consumption of the vehicle 8 as far as possible. The drive force Fc is a propulsive force propelling the vehicle 8 in the traveling direction.

The supercharger 54 includes an intake bypass path 69 for returning the supercharged intake air on the downstream side of the intake air compressor wheel 62 of the intake pipe 60 to the upstream side of the intake air compressor wheel 62 and an air bypass valve 70 opening and closing the intake bypass path 69.

The engine 12 includes an electronic throttle valve 72. The throttle valve 72 is a valve mechanism disposed downstream of the intake air compressor wheel 62 in the intake pipe 60 of the engine 12 to adjust an intake air amount Qin of the engine 12 and is actuated to open/close by an electrically-powered throttle actuator 94 depending on an operation amount of an accelerator pedal 88.

The electronic control device 100 is a device providing drive control of the engine 12 etc. and including a function as the vehicle drive control device of the present invention and includes a so-called microcomputer and executes signal processes in accordance with programs stored in advance to provide vehicle control related to the engine 12 and the continuously variable transmission 18, for example.

The electronic control device 100 is supplied from sensors and switches as depicted in FIGS. 1 and 2 with a signal indicative of the intake air amount Qin of the engine 12 detected by an air flow meter 73; a signal indicative of an opening degree θth of the electronic throttle valve 72, i.e., a throttle opening degree θth, detected by a throttle opening sensor 74; a signal indicative of an intake pressure Pthout (pressure of the intake manifold 57) detected by an intake pressure sensor 76 provided on the downstream side of the electronic throttle valve 72; a signal indicative of the downstream air pressure PLin of the intake air compressor wheel 62, i.e., the supercharging pressure Pcmout, in the intake pipe 60 detected by a supercharging pressure sensor 78; a signal indicative of the presence of depression of a brake pedal 80 detected by a footbrake switch 79; a signal indicative of a position of a shift lever 82 detected by a shift position sensor 81; a signal indicative of the engine rotation speed Ne detected by an engine rotation speed sensor 84; a signal indicative of the rotation speed Nin of the input shaft 36, i.e., the input rotation speed Nin of the continuously variable transmission 18, detected by an input shaft rotation speed sensor 85; a signal indicative of the rotation speed Nout of the output shaft 44, i.e., the output rotation speed Nout of the continuously variable transmission 18, detected by an output shaft rotation speed sensor 86; a signal from an accelerator opening degree sensor 90 indicative of the accelerator opening degree PAP (e.g., in %) that is a depression amount of the accelerator pedal 88 corresponding to a request output of a driver; a signal from a turbine rotation speed sensor 92 indicative of a rotation speed Nt of the turbine shaft 34 (hereinafter referred to as a "turbine rotation speed Nt" in rpm) (torque converter rotation speed Nt); and a signal indicative of the vehicle speed V detected by a vehicle speed sensor 96. The turbine rotation speed Nt is identical to the input rotation speed Nin during forward running with the forward clutch C1 completely engaged.

The electronic control device 100 supplies various output signals to the devices provided in the vehicle 8. For example, the electronic control device 100 controls the throttle opening degree θth based on the sequentially detected accelerator opening degree PAP in accordance with a throttle opening degree characteristic that is a predefined relationship between the throttle opening degree θth and the accelerator opening degree PAP. Specifically, when the accelerator opening degree PAP is larger, the throttle opening degree θth is made larger in accordance with the throttle opening degree characteristic.

In FIG. 2, an air bypass valve control portion 102 of the electronic control device 100 controls the opening/closing of the air bypass valve 70 for suppressing generation of a surge pressure caused by closing the electronic throttle valve 72 in the engine 12 in the supercharged state. The air bypass valve control portion 102 determines whether a change amount ΔP of the intake pressure Pthout exceeds a predetermined value $R_P$, where the change amount ΔP represents a change in the reducing direction per unit time and is calculated based on the intake pressure Pthout sequentially detected by the intake pressure sensor 76, and the air bypass valve control portion 102 controls the air bypass valve 70 to open when the change amount ΔP is larger than the predetermined value $R_P$. If the change amount ΔP is equal to or less than the predetermined value $R_P$, the air bypass valve control portion 102 determines whether a change amount ΔT of the electronic throttle valve 72 exceeds a predetermined value $R_T$, the change amount ΔT represents a change in the closing direction per unit time and is calculated based on the throttle opening degree θth sequentially detected by the throttle opening sensor 74, i.e., whether a closing speed dθth of the electronic throttle valve 72 is higher than a speed determination value E. The air bypass valve 70 is controlled to open if this determination is affirmative, and the air bypass valve 70 is controlled not to open if the determination is negative. The predetermined value $R_P$, the predetermined value $R_T$, and the speed determination value E are threshold values empirically defined in advance for determining whether the vehicle is in a state causing the generation of the surge pressure that is a sudden rise in intake pressure between the intake air compressor wheel 62 and the electronic throttle valve 72. In short, the air bypass valve control portion 102 determines whether the vehicle is in a state causing the generation of the surge pressure due to an increase in the supercharging pressure between the downstream side of the intake air compressor wheel 62 and the electronic throttle valve 72 because of closing of the electronic throttle valve 72, based on whether the change amount ΔP of the intake pressure Pthout in the reducing direction or the closing speed dθth of the electronic throttle valve 72 is larger than the predetermined value $R_P$ or the speed determination value E, and controls the air bypass valve 70 such that the air bypass valve 70 is opened from the closing side to the opening side so as not to generate the surge pressure and so as to return the intake air on the downstream side of the intake air compressor wheel 62 through the intake bypass path 69 to the upstream side.

A supercharging-time torque-down control portion 104 is disposed that provides torque-down control of the engine 12 placed in the supercharged state for the purpose of protection of the drive system by operating the electronic throttle valve 72 to the closing side at the time of stop (stall) of the vehicle 8. The protection of the drive system includes, for example, the protection of the continuously variable transmission 18 of the vehicle drive device 10. The torque-down control of the engine 12 at the time of stall will be described in detail with reference to FIGS. 2 and 3.

As depicted in FIG. 2, the supercharging-time torque-down control portion 104 is made up of a torque-down control condition determining portion 106, a torque-down control portion 108, a torque-down return control portion 110, and a torque-down termination determining portion 112.

The torque-down control condition determining portion 106 determines whether predefined torque-down conditions are satisfied for providing the torque-down control of the engine 12 in the supercharged state, based on various signals related to the information of the vehicle 8 sequentially detected from various sensors. The torque-down conditions include, for example, that (i) the engine rotation speed Ne detected by the engine rotation speed sensor 84 is equal to or greater than a predetermined value C, that (ii) the shift operation position of the shift lever 82 detected by the shift position sensor 81 is not at an operation position N (N position), that (iii) a speed ratio of the torque converter (torque converter speed ratio) (the turbine rotation speed Nt/the engine rotation speed Ne) is equal to or less than a predetermined value, and that (iv) a request engine torque Tetr requested by a driver determined based on the engine rotation speed Ne and the throttle opening degree θth is equal to or greater than a predetermined value and, if all the conditions of (i) to (iv) described above are satisfied, the torque-down control condition determining portion 106 determines that the torque-down control conditions are satisfied.

Figure 3:
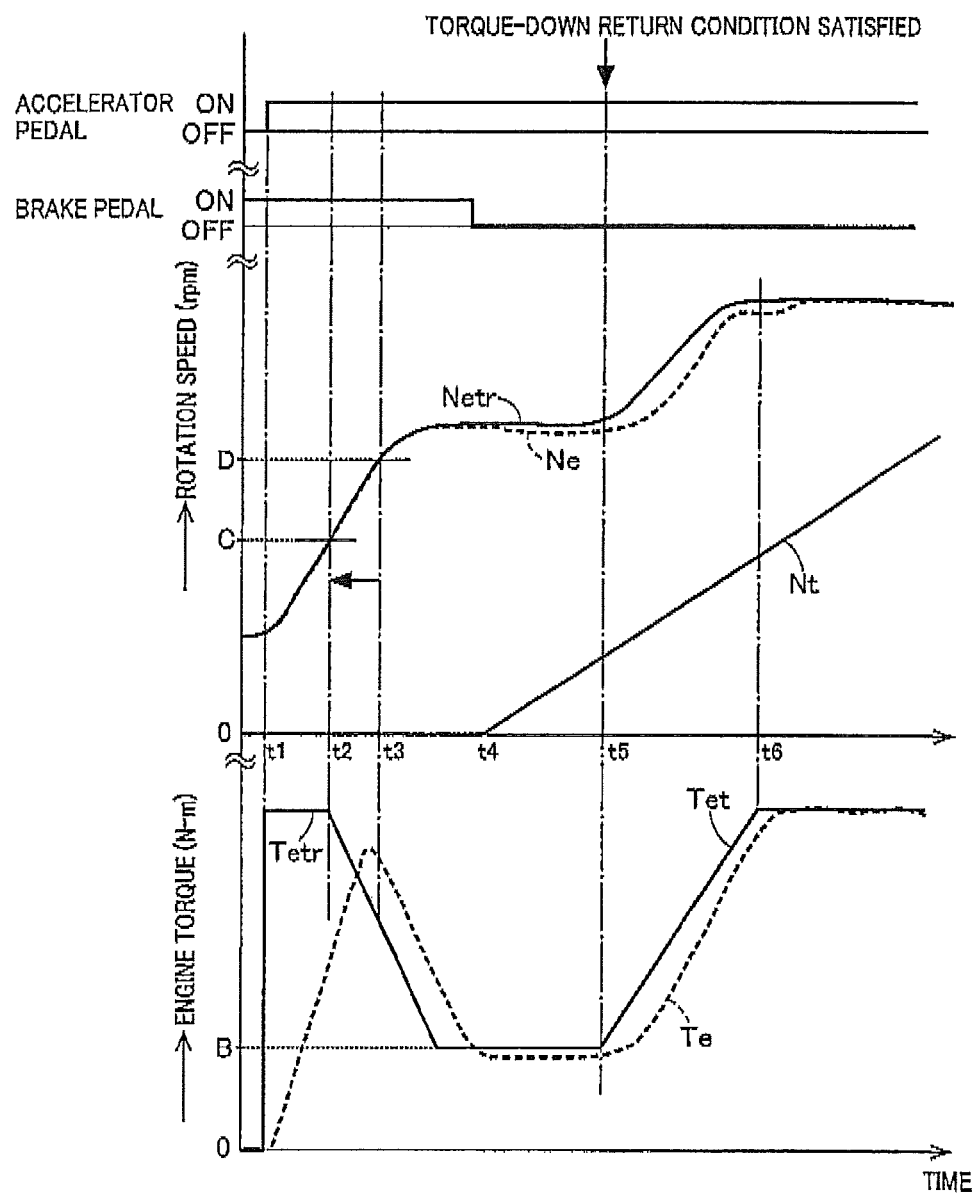
FIG. 3 is a time chart of each of an engine rotation speed Ne, a turbine rotation speed Nt, and an engine torque Te from the occurrence of the supercharged state to the end of the torque-down control in the torque-down control of the engine at the time of stall of the vehicle of FIG. 1.

FIG. 3 is a time chart of each of the engine rotation speed Ne, the turbine rotation speed Nt, and the engine torque Te from the occurrence of the supercharged state to the end of the torque-down control in the torque-down control of the engine 12 at the time of stop (stall) of the vehicle 8. In FIG. 3, for example, when the shift lever 82 is positioned at a shift operation position D (D position) (the condition of (ii) is satisfied) and the accelerator pedal 88 is depressed while the brake pedal 80 is depressed (at time t1), the engine rotation speed Ne increases in accordance with a rise in a request engine rotation speed Netr requested by the driver corresponding to the depression amount of the accelerator pedal 88. Because of the increase in the engine rotation speed Ne and the throttle opening degree θth made larger by the depression of the accelerator pedal 88, the request engine torque Tetr increases and becomes equal to or greater than the predetermined value (the condition of (iv) is satisfied). In this case, since the turbine rotation speed Nt is kept zero because of the depression of the brake pedal 80, the speed ratio of the torque converter 14 is zero (the condition of (iii) is satisfied). A target engine torque Tet generated at the time of the torque-down control (sweep torque-down control) provided by the torque-down control portion 108 described later is reduced at a constant reduction rate. The predetermined value C of the engine speed Ne in the condition of (i) (the engine rotation speed Ne at time t2 of FIG. 3) is a predetermined value that is made smaller than a threshold value D of the engine rotation speed Ne (the engine rotation speed Ne at time t3 of FIG. 3), which is one of the start conditions of the normal torque down control of the engine 12, such that the actual engine torque Te follows the target engine torque Tet (that is reduced at the constant reduction rate) without a delay. Specifically, the predetermined value C of the engine speed Ne in the condition of (i) is made smaller than the threshold value D, by the engine rotation speed Ne that is obtained by converting a torque corresponding to a response delay of the actual engine torque Te, through a torque converter capacity coefficient method. Therefore, the start timing of the torque-down control of the engine 12 in the supercharged state at which the torque-down control conditions (i) to (iv) are satisfied and the engine rotation speed Ne is equal to or larger than the predetermined value C, is advanced to time t2 as compared to the start timing of the normal torque-down control of the engine 12 (time t3). The normal torque-down control of the engine 12 is the control in which the electronic throttle valve 72 is caused to perform the closing operation at the closing speed dθth higher than the speed determination value E.

When acquiring a signal of the satisfaction of the torque-down control conditions from the torque-down control condition determining portion 106 (at time t2), the torque-down control portion 108 causes the electronic throttle valve 72 to perform the closing operation at a predetermined speed so as to provide the torque-down control (the sweep torque-down control) of the engine 12 in the supercharged state. Specifically, the torque-down control portion 108 determines the target engine torque Tet of the engine torque Te from a supercharging-time torque-down map empirically set in advance so as not to open the air bypass valve 70 while the purpose of the protection of the drive system is satisfied, and causes the electronic throttle valve 72 to perform the closing operation via the throttle actuator 94, thereby providing the torque-down control such that the actual engine torque Te is caused to follow, for example, made identical to, the target engine torque Tet. In the supercharging-time torque-down map, a reduction rate A of the target engine torque Tet is determined based on the supercharged state of the engine 12 indicated by using as an index the supercharging pressure Pcmout on the downstream side of the intake air compressor wheel 62 detected by the supercharging pressure sensor 78. This constant reduction rate A of the target engine torque Tet is determined such that the closing speed dθth of the electronic throttle valve 72 is lower than the speed determination value E that is a threshold value of whether the air bypass valve 70 is to be opened or not, and such that the target engine torque Tet for the protection of the drive system is reduced rapidly to a torque down target value B. The constant reduction rate A is made larger in a higher supercharging state unless the air bypass valve 70 is opened, and is 5 Nm/16 msec, for example. In short, when the torque-down control conditions are satisfied such as the engine rotation speed Ne equal to or greater than the predetermined value C and the torque converter speed ratio equal to or less than the predetermined value in the supercharged state, the torque-down control portion 108 controls the electronic throttle valve 72 via the throttle actuator 94 such that the electronic throttle valve 72 is caused to perform the closing operation at the closing speed dθth lower than the speed determination value E at which the air bypass valve 70 of the electronic throttle valve 72 is opened, thereby providing the torque-down control. After the target engine torque Tet reaches the torque down target value B, the torque-down control portion 108 controls the throttle valve 72 via the throttle actuator 94 to maintain the throttle opening degree θth such that the target engine torque Tet is maintained at the torque down target value B until a torque-down return control condition described later is satisfied.

When the torque-down control by the torque-down control portion 108 is started, the torque-down return control portion 110 of the supercharging-time torque-down control portion 104 determines whether a predefined torque-down return control condition is satisfied for returning from the torque-down control of the engine 12 in the supercharged state. The torque-down return control condition includes, for example, that (i) the engine rotation speed Ne detected by the engine rotation speed sensor 84 is less than a predetermined value, that (ii) the shift operation position of the shift lever 82 detected by the shift position sensor 81 is at the operation position N (N position), and that (iii) the torque converter speed ratio (the torque converter rotation speed Nt/the engine rotation speed Ne) is equal to or greater than a predetermined value and, if any one condition of (i) to (iii) described above is satisfied, the torque-down return control portion 110 determines that the torque-down return control condition is satisfied.

In FIG. 3, when the depression operation of the brake pedal 80 is turned off (time t4), since the turbine rotation speed Nt of the torque converter 14 is increased and the torque converter speed ratio (Nt/Ne) becomes equal to or greater than the predetermined value at time t5, the torque-down return control portion 110 determines that the torque-down return control condition is satisfied. When the torque-down return control condition is satisfied (time t5), the torque-down return control portion 110 transmits a signal to the torque-down control portion 108 to terminate the torque-down control and provide the torque-down return control. Specifically, the torque-down return control portion 110 controls the throttle actuator 94 driving the electronic throttle valve 72 via the torque-down control portion 108 thereby operating the electronic throttle valve 72 to the opening side. Then, the torque-down return control portion 110 causes the engine torque Te to become close to the target engine torque Tet which is determined by the supercharging-time torque-down map and which has a constant increase rate. The torque-down return control portion 110 sequentially acquires a status of implementation of the torque-down return control from the torque-down control portion 108.

After the start of the torque-down return control provided by the torque-down control portion 108, the torque-down termination determining portion 112 determines whether a torque-down control termination condition is satisfied. When the target engine torque Tet reaches the maximum value of the request engine torque Tetr at the time of stall of the vehicle 8 (at time t6) at a stage before start of the torque-down control (at a stage between time t1 and time t2), the torque-down termination determining portion 112 determines that the torque-down control termination condition is satisfied, and causes the torque-down control portion 108 via the torque-down return control portion 110 to terminate the operation of the electronic throttle valve 72 to the opening side, thereby terminating the torque-down return control. Thus, the torque-down termination determining portion 112 terminates the torque-down control of the engine 12 in the supercharged state.

Figure 4:
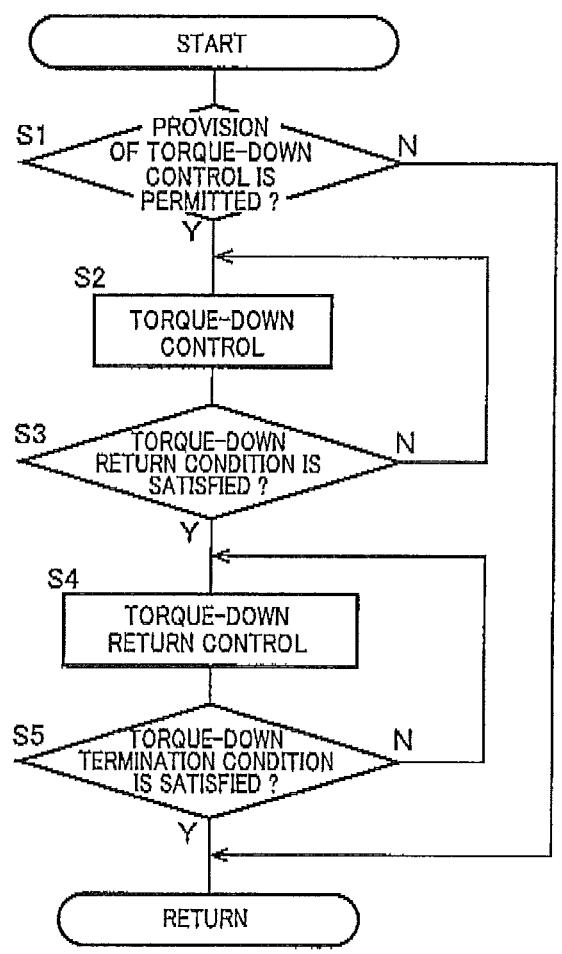
FIG. 4 is a flowchart for explaining a main portion of the control operation of the electronic control device of FIG. 1, i.e., the control operation of providing supercharging-time torque-down control.
Figure 5:
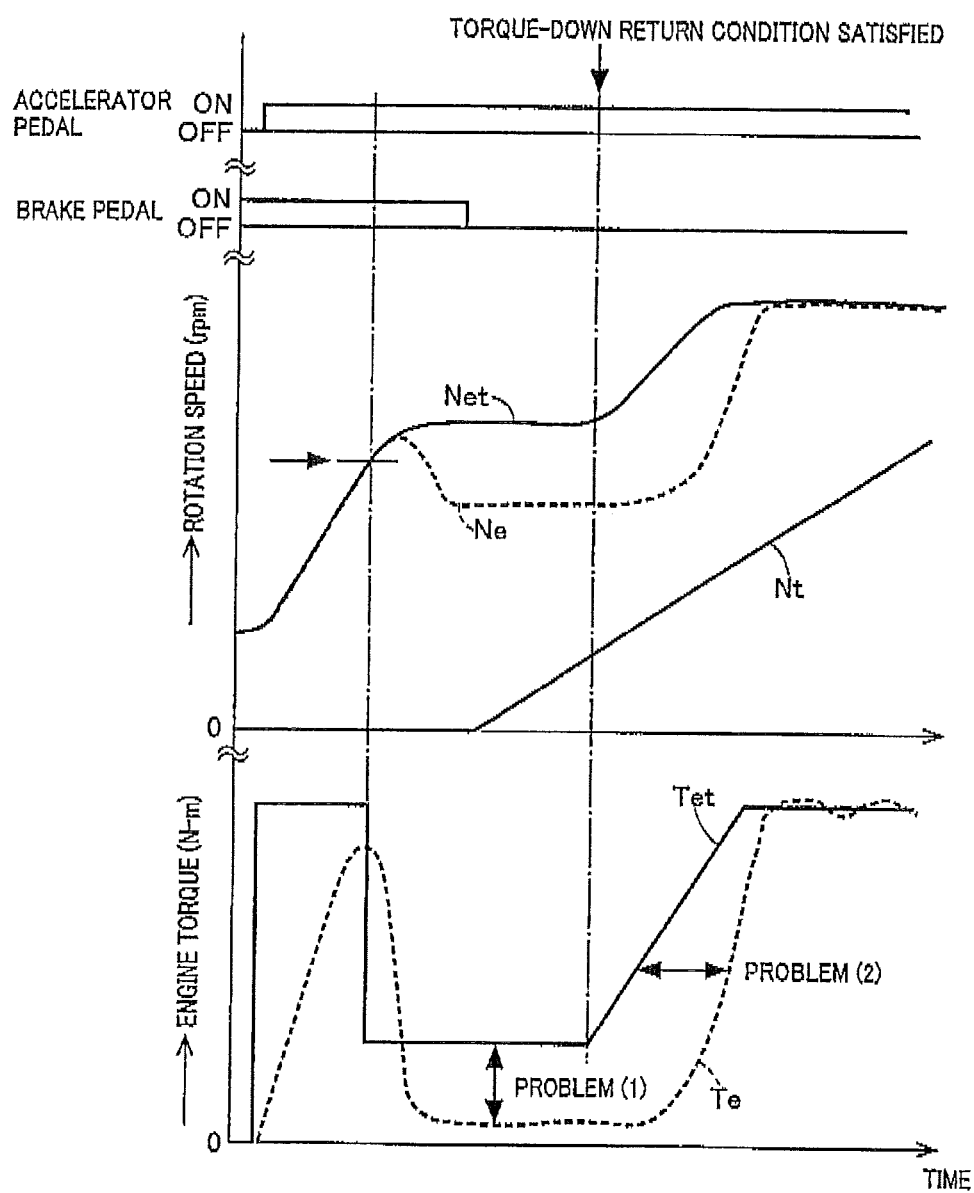
FIG. 5 is an example of a time chart of each of the engine rotation speed Ne, the turbine rotation speed Nt, and the engine torque Te from the occurrence of the supercharged state to the end of the torque-down control when the air bypass valve is opened in the torque-down control of the engine at the time of stall of the vehicle.

FIG. 4 is a flowchart for explaining a main portion of the control operation of the electronic control device 100, i.e., the control operation of providing supercharging-time torque-down control. The control operation depicted in FIG. 4 is repeatedly executed with a cycle of a few msec to a few tens of msec.

First, at step (hereinafter, "step" will be omitted) S1, it is determined whether the provision of the torque-down control is permitted. Specifically, it is determined whether the torque-down control conditions are satisfied based on the engine rotation speed Ne, the shift position, the turbine rotation speed Nt, and the throttle opening degree θth. If the determination of S1 is affirmative, S2 is executed. However, if the determination of S1 is negative, this flowchart is terminated. S1 corresponds to an operation of the torque-down control condition determining portion 106.

At S2, when it is determined that the torque-down control conditions are satisfied (at time t2), the torque-down control is provided. This torque-down control is started earlier (at time t2) than the start timing (at time t3) of the normal torque-down control of the engine 12 in which the electronic throttle valve 72 is caused to perform the closing operation at the closing speed dθth higher than the speed determination value E that is the threshold value of whether the air bypass valve 70 is to be opened by the air bypass valve control portion 102, and the constant reduction rate A of the target engine torque Tet is determined to be lower than the speed determination value E that is the threshold value of whether the air bypass valve 70 of the electronic throttle valve 72 is to be opened. After the execution of S2, S3 is executed.

At S3, it is determined whether the torque-down return control condition is satisfied based on the engine rotation speed Ne, the shift position, and the turbine rotation speed Nt. If the determination of S3 is affirmative, S4 is executed. If the determination of S3 is negative, S2 is executed again. S3 corresponds to an operation of the torque-down return control portion 110.

At S4, when it is determined that the torque-down return control condition is satisfied (at time t5), the torque-down return control is provided. In the torque-down return control, the electronic throttle valve 72 is operated to the opening side to increase the target engine torque Tet at the constant increase rate. After the execution of S4, S5 is executed. S2 and S4 correspond to an operation of the torque-down control portion 108.

At S5, it is determined whether the torque-down control termination condition is satisfied. Specifically, it is determined whether the target engine torque Tet is increased to the maximum value of the request engine torque Tetr before starting the torque-down control (between t1 and t2). If the determination of S5 is affirmative, the return from the torque-down control is completed, so that the torque-down control is terminated and this flowchart is terminated. On the other hand, if the determination of S5 is negative, S4 is executed again. S5 corresponds to an operation of the torque-down termination determining portion 112.

As described above, according to the electronic control device 100 of this example, in the torque-down control of the engine 12 in which the electronic throttle valve 72 is operated to the closing side upon satisfaction of the torque-down control conditions such as a condition that the engine rotation speed Ne is equal to or greater than the predetermined value C and the torque converter speed ratio is equal to or less than the predetermined value in the supercharged state, the electronic throttle valve 72 is caused to perform the closing operation at the closing speed dθth lower than the speed determination value E that is the threshold value of whether the air bypass valve 70 is to be opened or not, so that the air bypass valve 70 is not opened. This enables the suppression of the excessive reduction in the engine torque Te during the torque-down control of the engine 12 at the time of stall of the vehicle 8 in the supercharged state and the suppression of the reduction in engine torque responsiveness at the time of return from the torque-down control.

According to the electronic control device 100 of this example, with regard to the torque-down control of the engine 12 in which the electronic throttle valve 72 is caused to perform the closing operation at the closing speed dθth lower than the speed determination value E upon satisfaction of the torque-down control conditions such as a condition that the engine rotation speed Ne is equal to or greater than the predetermined value C and the torque converter speed ratio is equal to or less than the predetermined value in the supercharged state, the torque-down control is started earlier than the start timing of the torque-down control of the engine 12 in which the electronic throttle valve 72 is operatively closed at the closing speed dθth higher than the speed determination value E. Since this enables the suppression of a reduction in responsiveness of the actual engine torque Te corresponding to a reduction in the target engine torque Tet having the constant reduction rate at the time of the torque-down control, for example, the continuously variable transmission 18 can more certainly be protected.

Although the present invention has been described in detail with reference to the tables and the drawings, the present invention can also be implemented in other forms and may variously be modified without departing from the spirit thereof.

For example, in the torque-down control of the engine 12 at the time of stall of the vehicle 8, the electronic control device 100 of the example executes the supercharging-time torque-down control portion 104 to provide control such that the electronic throttle valve 72 is closed at the closing speed dθth lower than the speed determination value E that is the threshold value of whether the air bypass valve 70 is to be opened or not; however, the torque-down control of the engine 12 may be applied at the time of supercharging and high-load running other than the stall state of the vehicle.

With regard to the torque-down control termination condition determined by the torque-down termination determining portion 112 in the electronic control device 100 of the example, it is determined whether the termination condition is satisfied or not, depending on whether the target engine torque Tet is returned to the request engine torque Tetr at the stall state of the vehicle before the torque-down control is started by the torque-down control portion 108; however, this is not a limitation and, for example, the torque-down control termination condition may be whether a value of the intake air amount Qin/the engine rotation speed Ne calculated from the intake air amount Qin detected by the air flow meter 73 and the engine rotation speed Ne detected by the engine rotation speed sensor 84 becomes smaller than a predetermined value and the vehicle 8 reaches a state in which the protection of the drive system is no longer required.

The above description is merely an example and, although not exemplarily illustrated one by one, the present invention can be implemented in variously modified and improved forms based on the knowledge of those skilled in the art without departing from the spirit thereof.

NOMENCLATURE OF ELEMENTS

8: vehicle
12: engine
54: supercharger
70: air bypass valve
72: electronic throttle valve
100: electronic control device (vehicle drive control device)

The invention claimed is:

1. A vehicle drive control device in a vehicle including an engine comprising a throttle valve and a supercharger with an air bypass valve changed from a closing side to an opening side when a closing speed of the throttle valve is higher than a speed determination value, the vehicle drive control device providing a torque-down control of the engine by operating the throttle valve to a closing side, wherein
the torque-down control of the engine is performed when (i) a rotation speed of the engine is equal to or greater than a predetermined rotation speed and (ii) a speed ratio of a torque converter of the vehicle is equal to or less than a predetermined value in a supercharged state, and the torque-down control of the engine causes the closing speed of the throttle valve to be lower than the speed determination value above which the air bypass valve is changed from the closing side to the opening side.

2. The vehicle drive control device of claim 1, wherein the torque-down control of the engine, in which the closing speed of the throttle valve is caused to be lower than the speed determination value, is started earlier than the torque-down control would be started if the closing speed of the throttle valve were to be higher than the speed determination value.

3. A vehicle drive control device in a vehicle having an engine with a throttle valve and a supercharger with an air bypass valve that is changed from a closing side to an opening side when a closing speed of the throttle valve is higher than a speed determination value, the vehicle drive control device comprising:
an electronic control device including a microcomputer configured to perform a torque-down control of the engine by operating the throttle valve toward a closing side, wherein
the electronic control device is configured to perform the torque-down control of the engine when (i) a rotation speed of the engine is equal to or greater than a predetermined rotation speed and (ii) a speed ratio of a torque converter of the vehicle is equal to or less than a predetermined value in a supercharged state, and
the electronic control device is configured to perform the torque-down control while causing the closing speed of the throttle valve to be lower than the speed determination value above which the air bypass valve is changed from the closing side to the opening side.

4. The vehicle drive control device of claim 3, wherein the predetermined rotation speed at which the electronic control device starts the torque-down control of the engine is lower than the engine speed at which the torque-down control would be started if the closing speed of the throttle valve during the torque-down control were to be higher than the speed determination value.

* * * * *